No. 813,235. PATENTED FEB. 20, 1906.
W. J. PINE & L. P. HYNES.
STEAM PIPE COUPLING.
APPLICATION FILED FEB. 10, 1905.
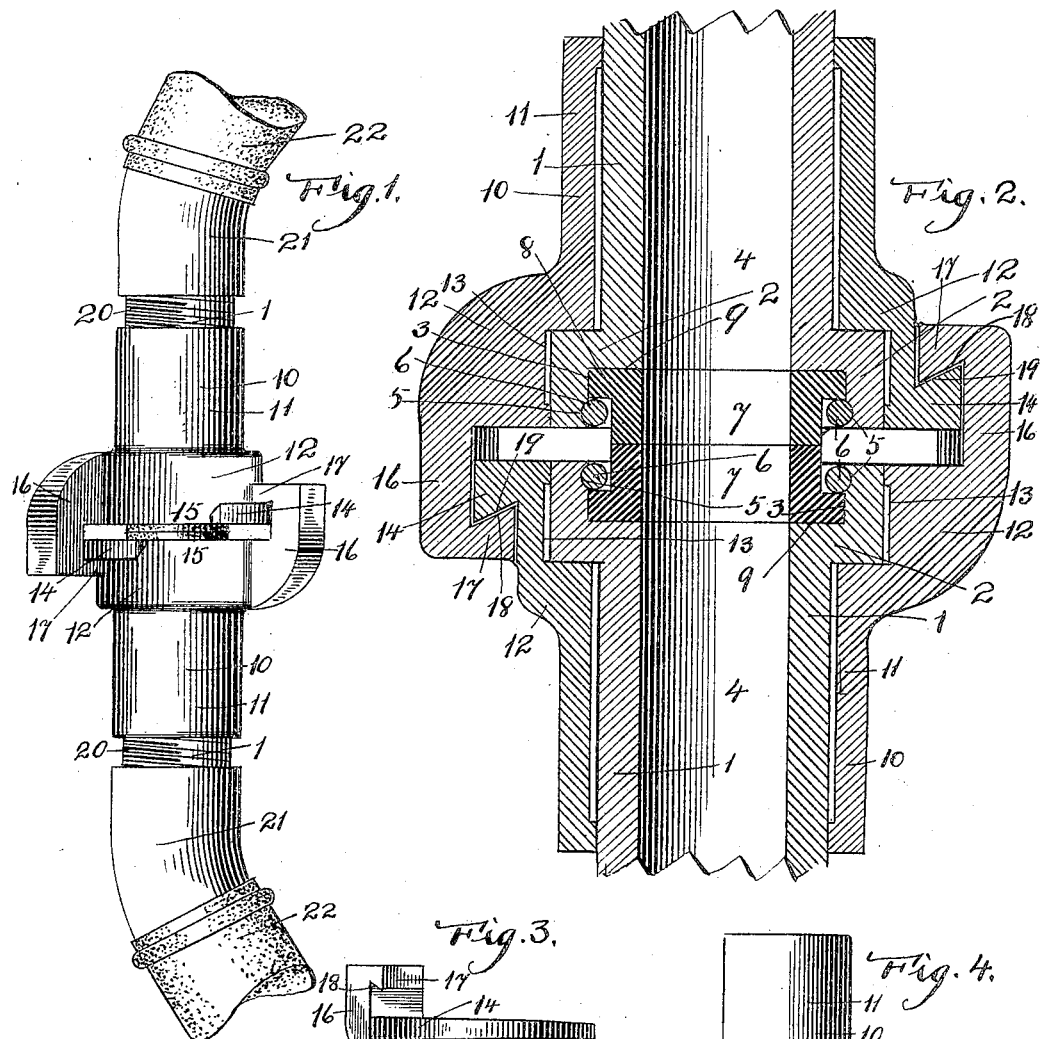
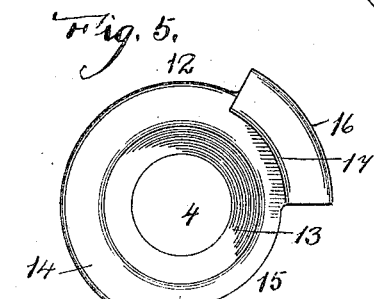

UNITED STATES PATENT OFFICE.

WILLIAM J. PINE, OF CHICAGO, ILLINOIS, AND LEE P. HYNES, OF LAPORTE, INDIANA.

STEAM-PIPE COUPLING.

No. 813,235.      Specification of Letters Patent.      Patented Feb. 20, 1906.

Application filed February 10, 1905. Serial No. 245,165.

*To all whom it may concern:*

Be it known that we, WILLIAM J. PINE, residing at Chicago, in the county of Cook and State of Illinois, and LEE P. HYNES, residing at Laporte, in the county of Laporte and State of Indiana, citizens of the United States, have invented certain new and useful Improvements in Steam-Pipe Couplers, of which the following is a specification.

This invention is intended more especially for use as a coupler in connecting steam-pipes between cars of a train, although it may be used in other connections in which it is desirable and necessary to provide an absolutely steam-tight joint which may be quickly coupled and uncoupled and when coupled will not only prevent the escape of steam, but insure a strong and rigid connection between the pipe-sections.

Another object of invention is to so construct the parts that the companion couplers will be interchangeable, thereby enabling one coupler to be used with any other coupler in the system and obviating the necessity for using definite pairs of couplers.

The invention consists in the features of construction of a combination of parts hereinafter described and claimed.

In the drawings illustrating the invention, Figure 1 is a side elevation of a pair of couplers locked together; Fig. 2, an enlarged section of elevation of same; Fig. 3, a side elevation of one of the sections; Fig. 4, a side elevation of two sections ready to be locked; Fig. 5, an end elevation of one of the sections.

In describing the coupling it will be understood that both of the sections or couplers are identical, and each consists of a tubular shank 1, provided at its coupling end with an enlarged head 2, having a bore 3 of greater diameter than the bore 4 of the shank, and the bore 3 is provided around its inner edge with an annular groove 5, into which is sprung a split metal ring 6, which holds in place a rubber gasket 7, provided with a flange 8 round its inner edge, which flange is contacted by the split ring, which serves to prevent the removal of the gasket. At the same time the gasket is firmly positioned and held against a shoulder or abutment 9 and has an inner diameter corresponding to the diameter of the bore of the tubular shank, which provides an uninterrupted passage for the steam. Surrounding the tubular shank is a coupling shell or casing 10, which consists of a tubular body portion 11, surrounding the tubular shank, and an enlarged coupling-head 12, surrounding the head 2 and having a bore 13, which allows the inner and outer members to fit closely into one another. The coupling-head 12 is provided at one side with a flange 14, which extends around a portion of the inner or engaging edge of the head, and said flange is slightly tapered or inclined. The flange is cut away at a point 15, leaving the head smooth and open, and the flange at its point of beginning is thinnest, being gradually and uniformly thickened or inclined until it merges into a projecting wall 16, which is curved on its exterior and has an inner curvature sufficient to embrace the tapered flange on the companion section of the coupling. The projecting wall terminates in an overhanging flange 17, which may be called the "engaging" flange as distinguished from the retaining-flange with which it coöperates. The engaging flange is provided with a beveled contacting face 18, and the retaining-flange is provided with a corresponding beveled engaging face 19, which permits the two sections to be locked or coupled together when in use.

The inner tubular shank is provided at its end with screw-threads 20, onto which is preferably screwed a slightly-bent section of metal tubing 21, which serves as a coupling for the attachment of the steam-hose 22 of the steam system.

In use the sections or couplers are brought together in the position shown in Fig. 4, in which the projecting or engaging wall 16 of each section or coupler is passed through the opening 15 of the companion section, after which the sections are given a partial turn, which causes each of the beveled engaging flanges 17 to overhang the correspondingly-beveled retaining-flanges of the companion sections. As the latter are inclined from the opening, it is obvious that when the parts are turned into the position shown in Fig. 1 the beveled flanges of the companion sections will bind together, forcing the two gaskets into close impingement, and the further the parts are turned the greater will be the force exerted on the gaskets and the tighter the joint. At the same time a slight amount of wear on the parts will not impair their operation, since it will only be necessary to give the couplers a slight additional turn to take up any wear or looseness that may be occasioned by continual usage. The arrangement is one which enables the parts to be very quickly engaged and disengaged and insures a tight perfect joint at all times. Each of the sections or couplers of the coupling is complete in itself and can be used with any other section or coupler in the entire system, since the two sections are precisely alike and all of the sections or couplers of the system are made correspondingly. The method of securing the gaskets in place is one which enables them to be quickly positioned or removed and at the same time securely locks them in place when positioned and prevents their displacement.

What we regard as new, and desire to secure by Letters Patent, is—

1. A coupling member provided round a portion of its engaging edge with a flange leaving an open space at one end and being tapered or thickened away from the opening, a projecting wall having an inner diameter sufficient to embrace the tapered flange of a companion section and provided at its outer edge with an overhanging flange adapted to engage the tapered flange of the companion section, the flanges being beveled to interlock with one another and form a dovetail joint, and said walls adapted to be arranged opposite each other when the coupling is effected, substantially as described.

2. A coupling consisting of two companion sections each consisting of a circular coupling-sleeve having formed integrally around a portion of its periphery a flange terminating in an open space and thickened or tapered away from the open space, and terminating in a projecting wall formed integrally with the coupling-head having an inner curvature sufficient to embrace the tapered flange of the companion section and arranged so that the projecting walls will be opposite each other when the coupling is effected, and an inwardly-projecting engaging flange on each of the projecting walls adapted to engage a tapered flange of a companion section, all of the flanges being beveled to interlock with one another and form a dovetail joint, each of the coupling-sleeves having within it a tubular member having at its engaging end a rubber gasket, the two gaskets being adapted to contact with one another when the coupling is locked, substantially as described.

3. A coupling consisting of two companion sections each consisting of an inner tubular shank having an enlarged head, companion gaskets within the enlarged heads, coupling-sleeves surrounding the tubular shanks and each provided around a portion of its edge with a tapered flange formed integrally therewith, leaving an opening at its thinnest point, each of the flanges terminating in a projecting wall, adapted to be arranged opposite each other when the coupling is effected, said walls being formed integrally with the coupling-sleeve, and each having around its edge an inwardly-projecting flange adapted to engage the tapered flange of the companion section, all of the flanges being beveled to interlock with one another, substantially as described.

4. A coupling consisting of two companion sections each consisting of a coupling-sleeve provided around a portion of its rim with a retaining-flange formed integrally therewith leaving an opening at one end, and each of the sleeves being further provided with a forwardly-projecting wall formed integrally therewith, said walls adapted to be arranged opposite each other when the coupling is effected and each having an interior diameter sufficient to embrace the retaining-flange of the companion section, and having an inwardly-projecting engaging flange integrally formed with the coupling-sleeve and adapted to coact with the retaining-flange of the companion section, one of the flanges being inclined to lock with its companion flange after a predetermined degree of revolution of the two sections, and all of the flanges being beveled to interlock with one another and form a dovetail joint, substantially as described.

5. A coupler consisting of two companion sections each consisting of a coupling-sleeve provided around a portion of its rim with a retaining-flange formed integrally therewith, leaving an opening at one end, and each of the sleeves being further provided with a forwardly-projecting wall formed integrally therewith said walls adapted to be arranged opposite each other when the coupling is effected, and each having an interior diameter sufficient to embrace the retaining-flange of the companion section, and having an inwardly-projecting engaging flange adapted to coact with the retaining-flange of the companion section, one of the flanges being inclined to lock with its companion flange after a predetermined degree of revolution of the two sections, all of the flanges being beveled to interlock with one another and form a dovetail joint, and a tubular shank passing through each of the coupling-sleeves, and having a counterbore on its inner face, and companion gaskets fitted into and outwardly projecting from the counterbores, substantially as described.

6. A coupler consisting of two companion sections each consisting of a coupling-sleeve provided around a portion of its rim with a retaining-flange formed integrally therewith, leaving an opening at one end, and each of the sleeves being further provided with a forwardly-projecting wall formed integrally therewith said walls adapted to be arranged opposite one another when the coupling is effected and each having an interior diameter sufficient to embrace the retaining-flange on the companion section, and having an inwardly-projecting engaging flange adapted to coact with the retaining-flange of the companion section, one of the flanges being inclined to lock with its companion flange after a predetermined degree of revolution of the two sections, all of the flanges being beveled to interlock with one another and form a dovetail joint, and a tubular shank passing through each of the coupling-sleeves, and having a counterbore on its inner face, companion gaskets fitted into and outwardly projecting from the counterbores, and a split ring for each section entered into a recess in the counterbore for holding each of the gaskets in place, substantially as described.

WILLIAM J. PINE.
LEE P. HYNES.

Witnesses for William J. Pine:
   SAMUEL W. BANNING,
   OSCAR W. BOND.

Witnesses for Lee P. Hynes:
   A. A. DOOLITTLE,
   H. G. McCALL.